United States Patent [19]

Drake

[11] Patent Number: 4,770,341

[45] Date of Patent: Sep. 13, 1988

[54] MANIFOLD

[75] Inventor: Lawrence V. Drake, Buffalo, Minn.

[73] Assignee: Infloor, Inc., Hamel, Minn.

[21] Appl. No.: 72,882

[22] Filed: Jul. 14, 1987

[51] Int. Cl.<sup>4</sup> ............................................. F24D 5/10
[52] U.S. Cl. .................................. 237/69; 137/861;
   137/271; 165/173
[58] Field of Search .................. 137/861, 875, 561 R,
   137/563, 334, 340, 271; 237/56, 8 R, 69;
   165/49, 168, 171, 173, 175

[56] References Cited

U.S. PATENT DOCUMENTS 3,506,029  4/1970  Demler et al. .................. 137/561 R
3,934,605  1/1976  Legris ............................. 137/561 R Primary Examiner—Henry Bennett
Attorney, Agent, or Firm—James R. Haller

[57] ABSTRACT

A manifold which is useful in receiving a heated liquid such as warm water from a suitable source and for distributing that liquid to a plurality of floor heat exchangers and for receiving liquid from the heat exchangers and returning that liquid to the source. The manifold includes a plurality of separate manifold elements that can be stacked adjacent one another, each element having a first and second chamber. The first and second chambers of the elements together define first and second distribution vessels within the manifold. Each manifold element includes inlet and outlet ports communicating with the respective distribution vessels for carrying liquid to and from the heat exchangers. The manifold elements desirably are integrally formed from plastic or other material exhibiting a coefficient thermal conductivity of less than 1.0 kcal/M h °C.

8 Claims, 3 Drawing Sheets

MANIFOLD

FIELD OF THE INVENTION

The invention relates to the field of floor heating systems for buildings, and particularly to heating systems employing a heated fluid which is used to warm the floor.

BACKGROUND OF THE INVENTION

Various fluid heating systems utilizing, for example, hot water, have been used to provide radiant heat to selected spaces. In my copending U.S. patent application Ser. No. 931,682, filed November 17, 1986, there is described a heating system involving a plurality of tubes that are imbedded in a floor and to which water at a preselected temperature is provided by means of a fluid flow control apparatus which includes a pump. It was contemplated that several of the flow control units would be employed in a single building to control the temperature of various floor areas.

SUMMARY OF THE INVENTION

The present invention provides a manifold which is useful in receiving a heated liquid such as warm water from a suitable source such as the fluid flow control apparatus described above and for distributing that liquid to a plurality of floor heat exchangers such as tubing imbedded in cementitious flooring so that the temperature of various flooring areas can be separately controlled, the manifold also receiving liquid at lower temperatures from the heat exchangers and returning that liquid to the source. The manifold comprises a plurality of separate manifold elements positioned adjacent one another and each comprising a housing having a first chamber and a second chamber. Communicating means are provided to connect each first chamber to the first chamber of at least one adjacent element and to connect each second chamber to the second chamber of at least one adjacent element so that the first chambers together define a first distribution vessel and the second chambers together define a second distribution vessel, each such distribution vessel hence being common to the manifold elements of which it is comprised. The housing of each manifold element includes inlet and outlet ports communicating respectively with the first and second distribution vessels for carrying liquid to and from the manifold to floor heat exchangers. Duct means are provided to supply heated fluid to one of the distribution vessels and to withdraw fluid at a lower temperature from the other distribution vessel.

In a preferred embodiment, the manifold elements are provided with valve means for independently adjusting the flow rate of liquid through the inlet or outlet ports or both of each manifold element. The valves preferably comprise hollow, manually rotatable tubular elements that are rotatably received in the housing and which have an open end and a wall with an orifice therein, the open end communicating with the inlet or outlet port and the opening in the wall communicating with one of the distribution vessels. By rotating the valve, the area of flow through the opening in the wall that is available for flow may be adjusted.

DETAILED DESCRIPTION

Figure 1:
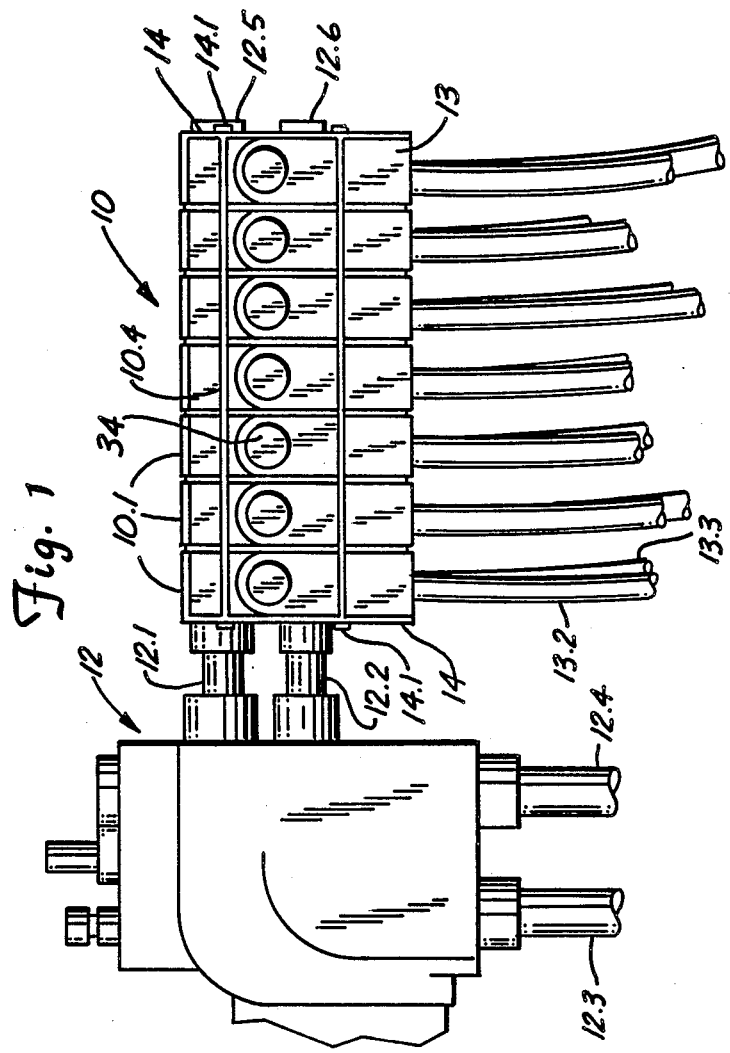
FIG. 1 is a front view of a manifold of the invention, shown in association with a valve and pump assembly.

Referring to FIG. 1, a manifold of the invention is shown generally as 10 and is depicted as being attached to a pump and valve assembly 12, the latter supplying warmed fluid such as water through duct 12.1 to the manifold and receiving the liquid at a lower temperature through the duct 12.2. The device 12 in turn receives heated liquid from a source (not shown) and returns somewhat cooler liquid to the source through the conduits 12.3, 12.4. The device 12 is described in greater detail in my pending U.S. patent application serial number 931,682, filed November 17, 1986, the teachings of which are incorporated herein by reference. If desired, of course, the ducts 12.1, 12.2 could be connected directly to the conduits 12.3, 12.4, thereby bypassing the device 12.

Figure 2:
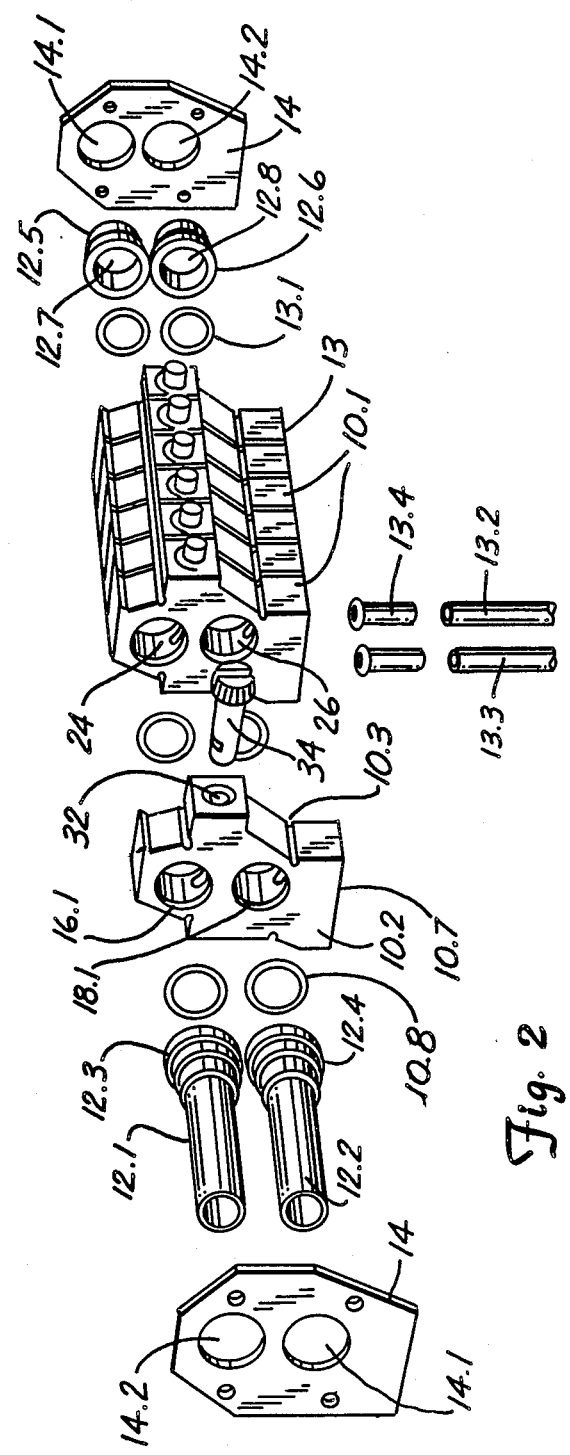
FIG. 2 is an exploded view of the manifold assembly of FIG. 1.

The manifold 10, as shown in FIGS. 1 and 2, comprises a plurality of separate manifold elements 10.1, the elements having generally parallel sides 10.2 so that they can be stacked together as shown in FIGS. 1 and 2. The manifold elements 10.1 desirably are identical to one another, and a plurality of these elements may be maintained in an aligned, oriented position by being captured between end plates 14. In a preferred embodiment, the manifold elements are provided with grooves (as at 10.3 in FIG. 2) in which are received elongated rods or struts 10.4, the struts having threaded ends that extend outwardly beyond the end plates 14 and which are fastened to the end plates by, e.g., threaded nuts 14.1.

With reference to FIGS. 2-5, each manifold element comprises a housing including a through bore 16 having an opening 16.1 of wider diameter at one side which defines an outwardly facing annular shoulder 16.2, the bore 16 defining a first chamber within the manifold element. A similar bore 18 is also formed within the manifold element parallel to the bore 16 but spaced below it, the bore 18 including an outer portion 18.1 of wider diameter and which in turn defines an outwardly facing shoulder 18.2. As thus described, the face 10.5 of the manifold element is substantially flat except for those areas in which bore holes are formed as thus described.

The other, parallel face 10.6 of each manifold element is suitably machined about the bore 16 so as to provide an outwardly protruding tubular section 20, 22, surrounding the respective bores 16, 18, the tubular portions 20 and 22 being so sized as to fit within the enlarged portions 16.1, 18.1 of the next adjacent manifold element. Annular recesses 20.1, 22.1 are provided about the rims of the tubular elements to seal, via "O" rings, those elements to the annular walls and respective shoulders 16.2, 18.2 of the enlarged bore portions of the adjacent manifold element. In this manner, when the manifold elements are stacked together as shown in FIGS. 1 and 2, each manifold element sealingly engages a neighboring manifold element so that the chambers defined by the bores 16, 18 are aligned and in communication with one another, the chambers thus forming elongated, generally tubular distribution vessels shown in 24 and 26 in FIG. 2 and which run the length of the manifold. The ducts 12.1, 12.2 shown in FIGS. 1 and 2 are attached by means of suitable fittings 12.3, 12.4 into the enlarged bores 16.1, 18.1 of the end most manifold element 10.7 (FIG. 2) utilizing O-rings 10.8, the fittings 12.3, 12.4 being substantially identical to the tubular portions 20, 22 shown in FIG. 4. The ducts 12.1, 12.2 extend outwardly through orifices 14.1, 14.2 in the end plate 14. Separate fittings 12.5, 12.6 are provided, the fittings being generally tubular in shape with closed ends 12.7, 12.8, each fitting having an open end contoured in a manner substantially identical to the bore openings 16.1, 18.1 of a manifold element so as to fit over and sealingly engage the tubular projections 20, 22 of the right hand-most manifold element 13, O-rings 13.1 being employed to complete the seal. The fittings 12.5, 12.6 are held sealingly against the adjacent manifold element by means of the end plate 14, and portions of the fittings 12.5, 12.6 may extend outwardly through the end plate orifices 14.1, 14.2.

Figure 3:
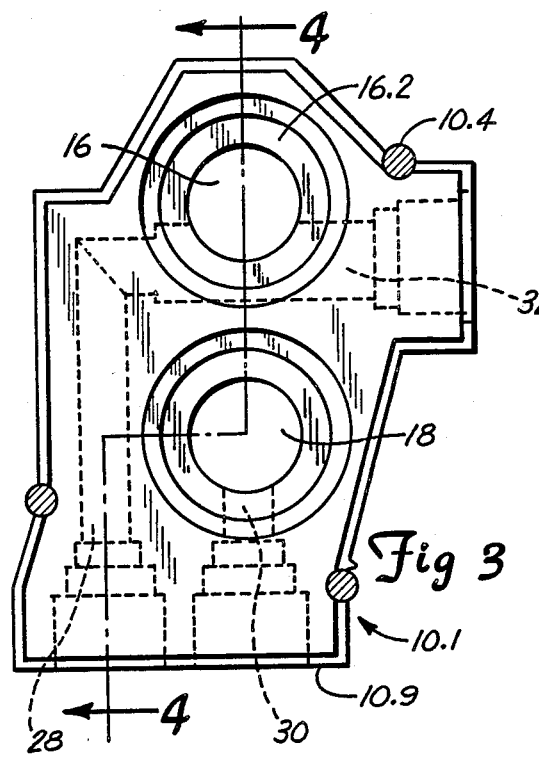
FIG. 3 is a side view of a manifold element shown also in FIG. 2.
Figure 4:
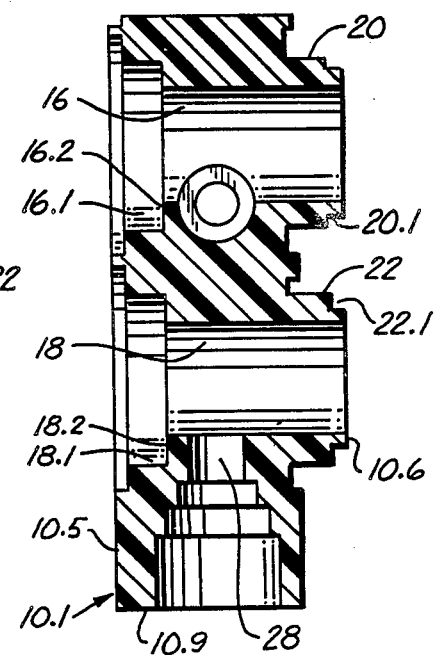
FIG. 4 is a cross-sectional view taken along line 4—4 of FIG. 3.
Figure 5:
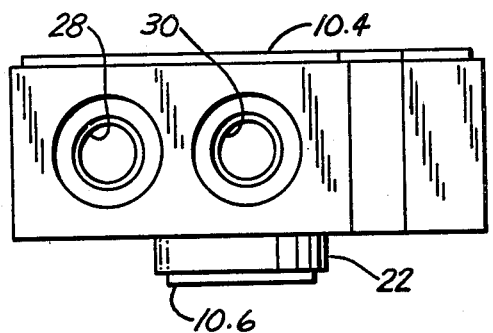
FIG. 5 is a bottom view of the manifold element shown in FIG. 3.
Figure 6:
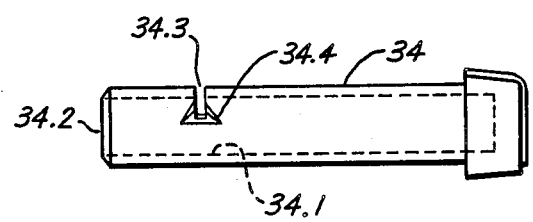
FIG. 6 is a side view of a valve useful in the embodiment of FIGS. 3-5.

With reference to FIG. 3, it will be seen that each manifold element in addition contains two separate bores 28, 30, extending upwardly from their bottom surfaces 10.9. The bore 30 extends into and hence communicates with the bore 18. The bore 28 extends upwardly within the manifold element and then is intersected by yet another bore designated 32 extending at substantially right angles to the bore 28 and which intersects as well the bore 16. Referring to FIG. 6, a tubular valve is shown at 34 and has a hollow interior 34.1, an open end 34.2 and a slot 34.3 formed perpendicular to the axis of the valve and extending through the valve wall, the slot at one end being widened into a triangular shape 34.4. The valve 34 is received within the bore 32 of FIG. 3, the end of the tubular valve 34.2 extending beyond the bore 16 and communicating with the bore 28. Slot 34.3 is so located as to communicate with the bore 16 when the slot faces upwardly as shown in FIG. 6, and it will be understood that as the tubular valve 34 is rotated about its axis, the slot 34.3 is rotated out of communication with the bore 16 and faces instead the interior of the bore 32. By judiciously adjusting the rotational position of the tubular valve 34, heated fluid within the bore 16 is permitted to flow through the valve and thence downwardly through the bore 28. The triangular portion of the valve 34.4 is used to provide the valve with greater adjustability and the ability to accomodate larger volumes of fluid.

The bores 28, 30 terminate downwardly in one or more sections of increasing diameter as shown in FIG. 3, and the inlet and outlet ports thus defined are provided with suitable fittings (not shown) to receive the ends of tubular elements that lead to the floor-imbedded heat exchangers. Such tubes are shown at 13.2, 13.3 in FIG. 1, and communicate respectively with bores 30, 28 of each of the manifold elements 10.1 as shown in FIG. 3. The ends of the tubes 13.2, 13.3 and the expanded interiors of the bores 28, 30 may be provided with suitable quick release fittings such as those shown schematically at 13.4 in FIG. 2, such fittings being, for example, Prestolok fittings that are commercially available from the Parker Corporation, Parker Brass Products Division.

Once the manifold, as thus described, has been assembled as shown in FIG. 1 and has been connected to a suitable source of heated liquid, judicious adjustment of the valves 34 permits heated fluid to flow at a controlled rate outwardly through tubes 13.2 to various floor-mounted heat exchangers and to return to the manifold through return tube 13.3. In this manner, the flow rate of heated fluid that is delivered to any particular flooring area can be closely regulated, thereby permitting the floor temperature of that area to be controlled.

The floor heat exchangers mentioned above desirably are comprised of serpentine-shaped lengths of plastic or rubber tubing that are imbedded in a cementitious floor underlayment, particularly underlayments manufactured from calcium sulfate hemihydrate, sand and water. A particularly advantageous floor underlayment of this type is that which is prepared from "Gyp-Crete 2000", a trademark product of Gyp-Crete Corporation.

The manifold elements 10.1 as thus described, except for fittings and the valve 34, are desirably made of a material exhibiting a coefficient of thermal conductivity of less than 1.0 kcal/m h ° C, and desirably is of a plastic such as an epoxy resin or other material having resistance to the liquid material. The use of a heat-insulative material more readily enables the manifold to operate with minimum heat transfer between the distribution vessels and avoids undue heat loss to the atmosphere from the manifold. The heat transfer liquid preferably is water but may be one of various other fluids such as ethylene glycol commonly used in heat transfer situations.

While a preferred embodiment of the present invention has been described, it should be understood that various changes, adaptations and modifications may be made therein without departing from the spirit of the invention and the scope of the appended claims.

What is claimed is:

1. A manifold useful in a floor heating system for supplying liquid at one temperature to floor heat exchangers and for receiving the liquid from the heat exchangers at lower temperatures, the manifold comprising a plurality of separate manifold elements positioned adjacent one another and each comprising a housing having a first chamber and a second chamber, communicating means connecting each first chamber to the first chamber of at least one adjacent element and connecting each second chamber to the second chamber of at least one adjacent element so that said first chambers together define a first distribution vessel and said second chambers together define a second distribution vessel, the housing of each manifold element including inlet and outlet ports communicating respectively with the first and second distribution vessels for carrying liquid to and from the manifold to floor heat exchangers, and duct means for supplying fluid to one of the distribution vessels and for withdrawing fluid from the other distribution vessel.

2. A manifold useful in a floor heating system for supplying liquid at one temperature to floor heat exchangers and for receiving liquid from the heat exchangers at lower temperatures, the manifold comprising a plurality of separate, individually adjustable manifold elements positioned adjacent one another and each comprising a housing having first and second openings therethrough and means sealing each housing to each adjacent housing, said first openings cooperating to define a first distribution vessel and said second openings cooperating to define a second distribution vessel, each housing manifold including inlet and outlet ports communicating respectively with the first and second distribution vessels for carrying liquid to and from the manifolds, end plates between which are carried the individual manifold elements, and strut means extending between and joining the end plates to support the manifold elements therebetween, at least one such end plate having orifices therethrough aligned with the distribution vessels, and duct means communicating through the orifice means with the first and second distribution vessels to supply and withdraw fluid therefrom.

3. A manifold useful in a floor heating system for supplying liquid at one temperature to floor heat exchangers and for receiving the liquid from the heat exchangers at lower temperatures, the manifold comprising a plurality of separate manifold elements positioned adjacent one another and each comprising a housing having a first chamber and a second chamber, communicating means connecting each first chamber to the first chamber of at least one adjacent element and connecting each second chamber to the second chamber of at least one adjacent element so that said first chambers together define a first distribution vessel and said second chambers together define a second distribution vessel, the housing of each manifold element including inlet and outlet ports communicating respectively with the first and second distribution vessels for carrying liquid to and from the manifold to floor heat exchangers, and a valve means carried by the manifold elements for adjusting the flow rate of liquid through the inlet port, the outlet port or both ports of the manifold elements, and duct means for supplying fluid to one of the distribution vessels and for withdrawing fluid from the other distribution vessel.

4. A manifold useful in a floor heating system for supplying liquid at one temperature to floor heat exchangers and for receiving the liquid from the heat exchangers at lower temperatures, the manifold comprising a plurality of separate manifold elements positioned adjacent one another and each comprising a housing having a first chamber and a second chamber, communicating means connecting each first chamber to the first chamber of at least one adjacent element and connecting each second chamber to the second chamber of at least one adjacent element so that said first chambers together define a first distribution vessel and said second chambers together define a second distribution vessel, strut means extending along the length of the manifold and ooperable to hold the manifold elements tightly against one another, said communicating means providing waterproof seals between the chambers of adjacent housing elements, the housing of each manifold element including inlet and outlet ports communicating respectively with the first and second distribution vessels for carrying liquid to and from the manifold to floor heat exchangers, and duct means for supplying fluid to one of the distribution vessels and for withdrawing fluid from the other distribution vessel.

5. The manifold of claim 3 wherein said valve means comprises a hollow, manually rotatable tubular element rotatably received in the housing and having an open end and a wall with an opening therein, said open end communicating with one of said inlet and outlet ports and said wall opening communicating with one of the distribution vessels, the area of flow through which opening is adjustable by rotation of the tubular element to vary the flow rate of liquid therethrough.

6. The manifold of claim 1 including strut means extending along the length of the manifold and operable to hold the manifold elements tightly against one another, said communicating means providing waterproof seals between the chambers of adjacent housing elements.

7. The manifold of claim 4 including end plates between which are carried the manifold elements, each end plate including orifices aligned with the first and second distribution vessels.

8. The manifold of claim 3 including valve means carried by the manifold elements for adjusting the flow rate of liquid through the inlet port, the outlet port, or bith ports, of the manifold elements.

* * * * *